United States Patent [19]
Edwards et al.

[11] Patent Number: 5,293,091
[45] Date of Patent: Mar. 8, 1994

[54] GENERATOR OUTPUT RECONNECTION SWITCH

[75] Inventors: Clyde S. Edwards; Richard R. Scroggins, both of Fridley, Minn.

[73] Assignee: ONAN Corporation, Minneapolis, Minn.

[21] Appl. No.: 813,349

[22] Filed: Dec. 24, 1991

[51] Int. Cl.⁵ .......................................... H02K 11/00
[52] U.S. Cl. ...................................... 310/71; 361/611
[58] Field of Search ................. 310/71, 179, 210, 219; 361/341, 346, 350, 352, 355; 200/308

[56] References Cited

U.S. PATENT DOCUMENTS

| | | | |
|---|---|---|---|
| 1,754,645 | 4/1930 | Oswald | 339/18 |
| 2,552,028 | 5/1951 | Blair | 172/280 |
| 2,727,215 | 12/1955 | Brown | 339/32 |
| 2,874,317 | 2/1959 | Couse | 310/71 |
| 2,922,054 | 1/1960 | Miller | 310/71 |
| 3,233,129 | 2/1966 | Schaefer | 310/71 |
| 3,602,748 | 8/1971 | Locke | 310/71 |
| 4,006,519 | 2/1977 | Long et al. | 29/749 |
| 4,709,294 | 11/1987 | Kim | 361/58 |
| 4,937,482 | 6/1990 | Dohogne | 310/71 |
| 5,007,156 | 4/1991 | Hurtgen | 310/71 |
| 5,099,091 | 3/1992 | Kokubu | 200/5 B |

OTHER PUBLICATIONS

Exhibit A–Onan Corporation, a brochure entitled "It's Built Like An Onan", (1990).
Exhibit B–Drawing dated prior to Jul. 22, 1991.
Exhibit C–Drawing entitled "L–Switches 600A" dated prior to Jul. 22, 1991.

Primary Examiner—Steven L. Stephan
Assistant Examiner—Matthew Nguyen
Attorney, Agent, or Firm—Merchant, Gould, Smith, Edell, Welter & Schmidt

[57] ABSTRACT

The present invention is directed towards an electrical switch. The switch has a first board to which input and output leads are attached proximate one end of a plurality of buses on the first board. Proximate the other ends of the plurality of buses are electrical contacts. The switch also has a second board which is interchangeably attachable to the first board. The second board includes a plurality of electrical buses that are selectively arranged to electronically connect the contacts on the first board. The connections electrically connect the input and output leads on the first board to provide a predetermined arrangement of electrical connections.

14 Claims, 14 Drawing Sheets

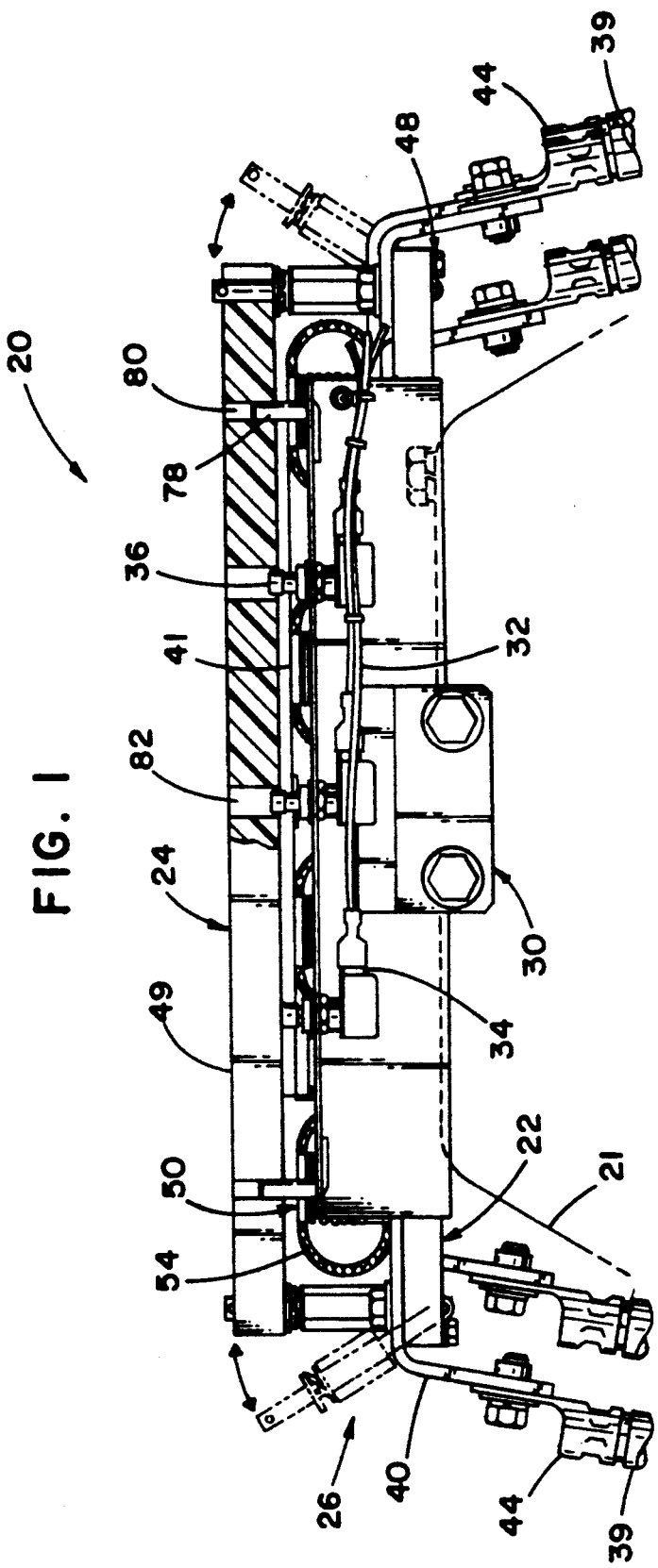

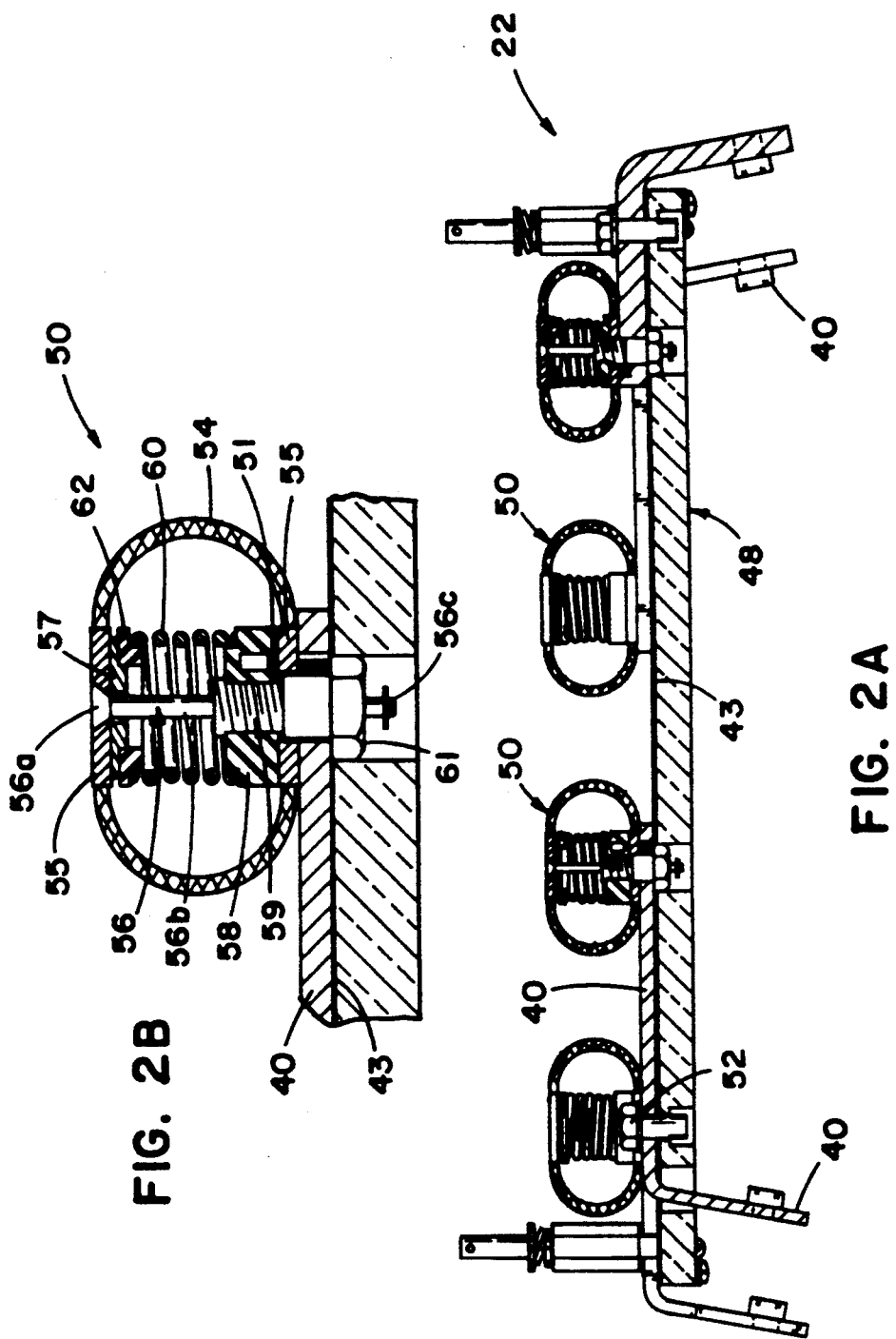

FIG. 3A
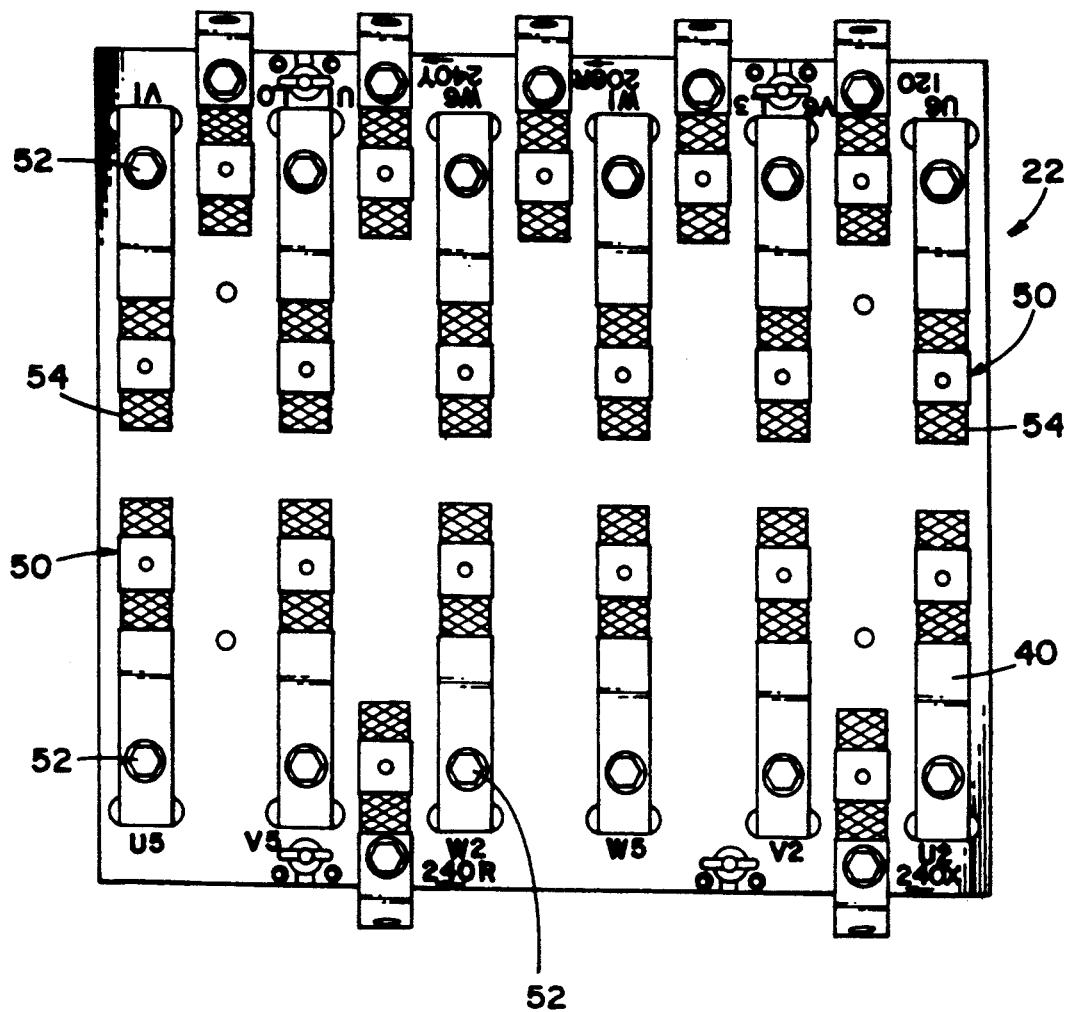
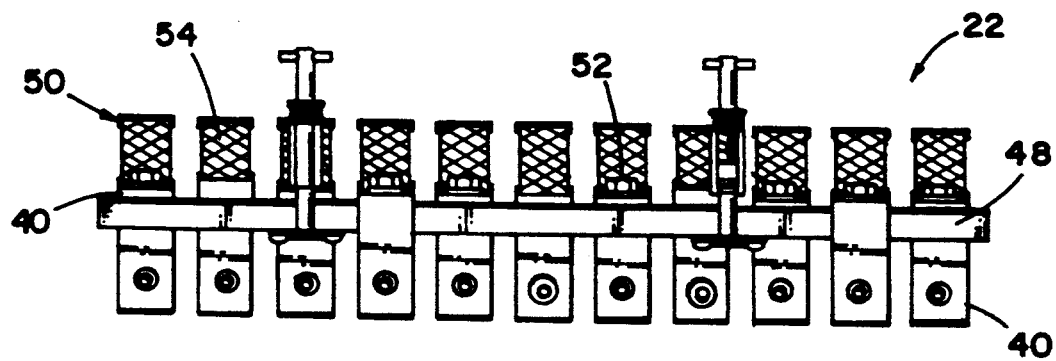
FIG. 3B

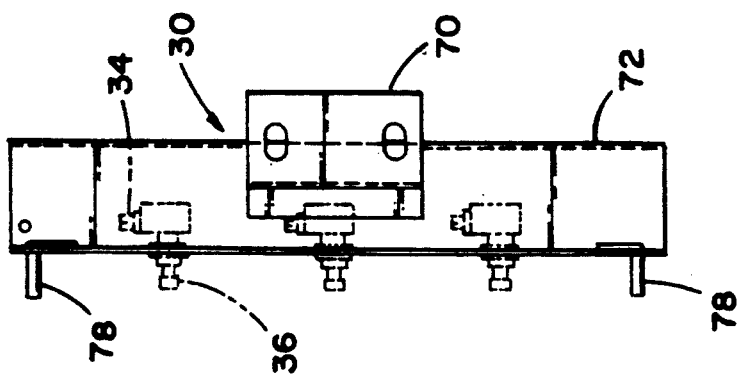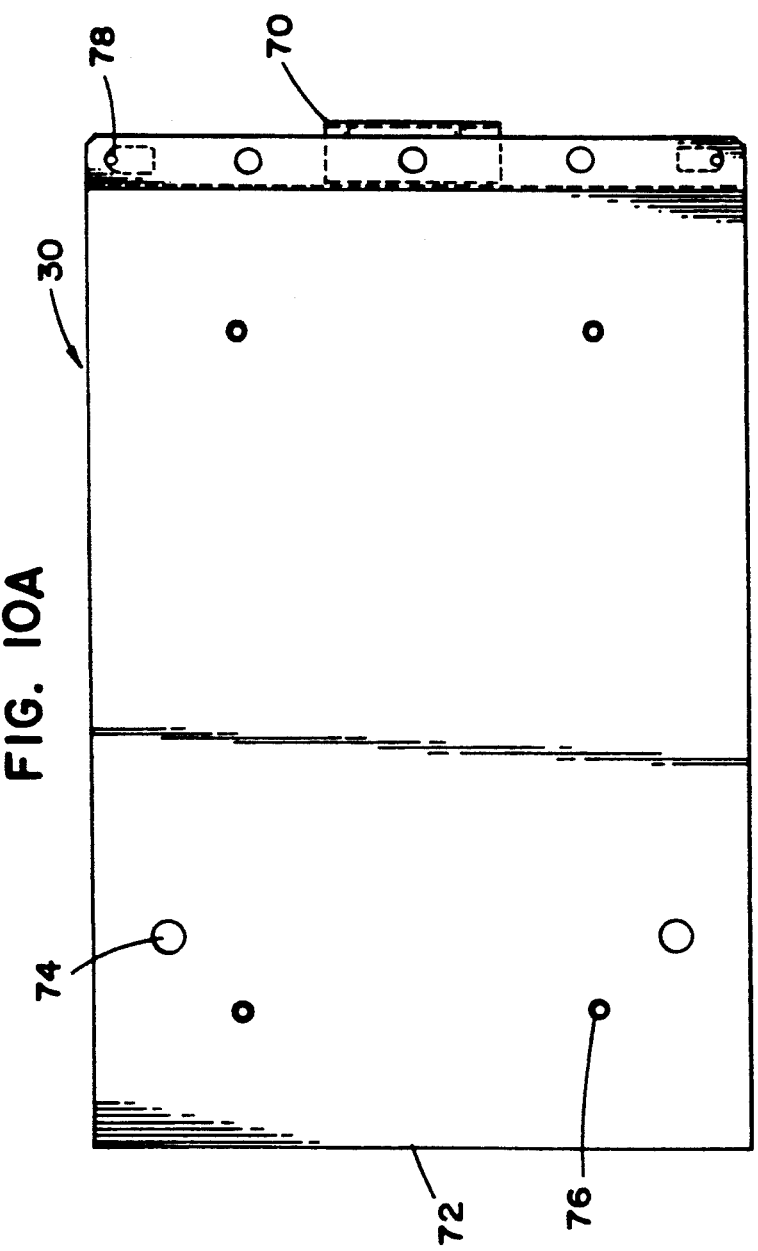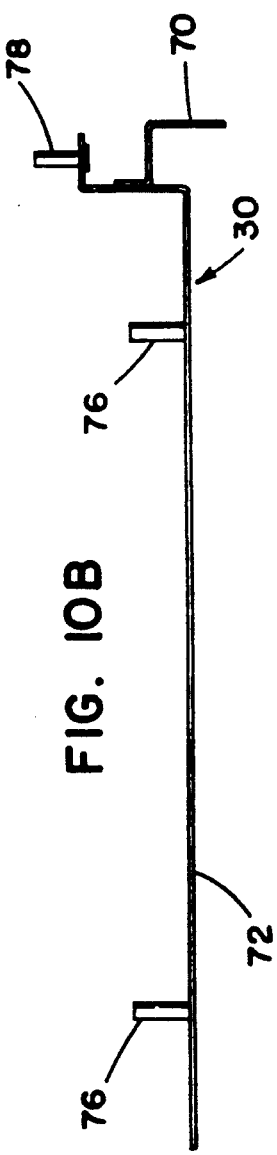

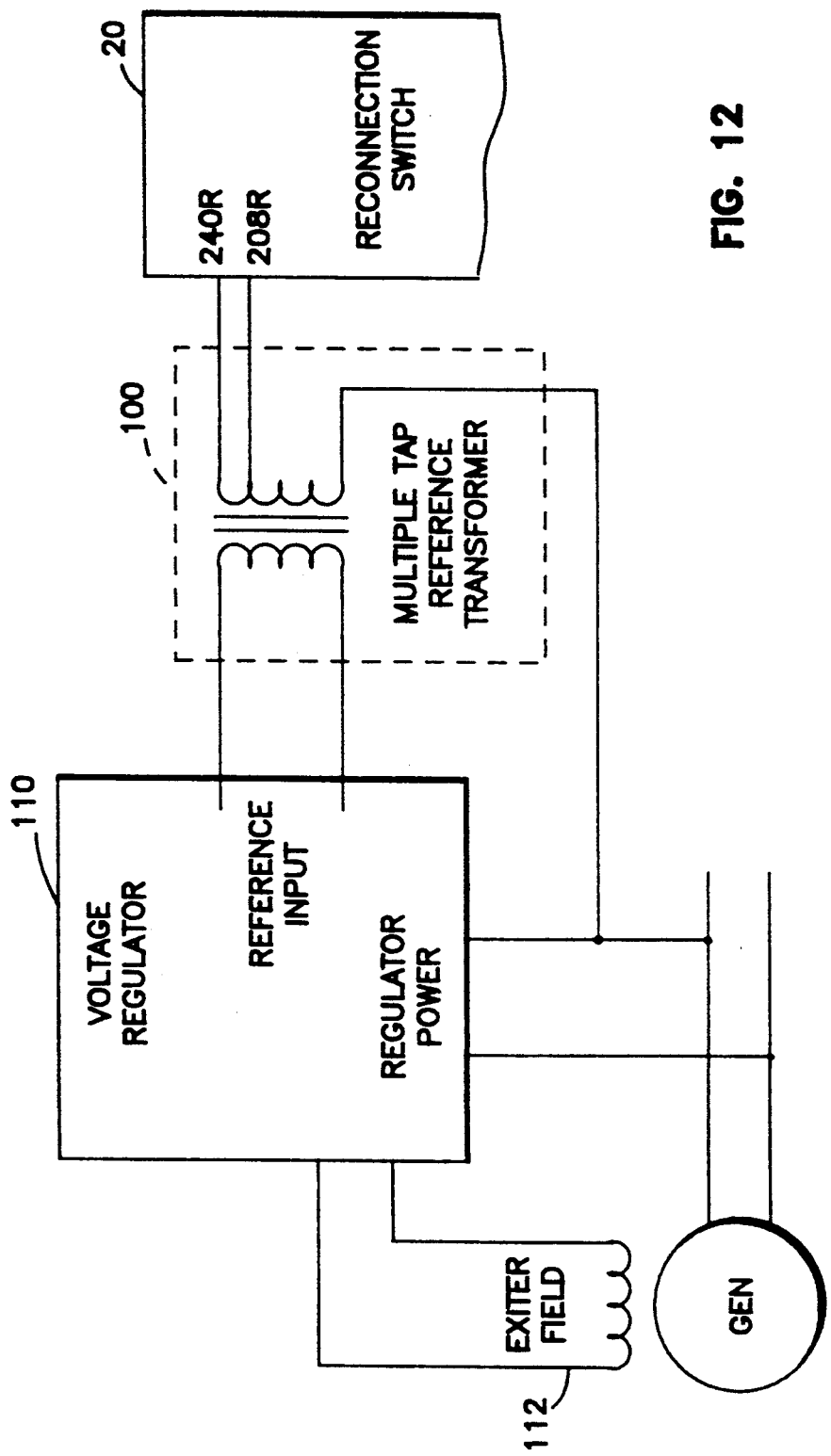

GENERATOR OUTPUT RECONNECTION SWITCH

BACKGROUND OF THE INVENTION

The present invention relates to a switch, and more particularly to a switch for changing the electrical output of a generator.

It is often necessary to change the electrical output of an electrical generator to meet the electrical requirements of the circuitry being powered by the generator. One way of accomplishing this with existing generators is to utilize what are referred to as shorting bars which are attached to the generator electrical contacts in an appropriate fashion to derive the desired electrical output. However, this typically requires that many fasteners holding down individual shorting bars be removed so as to allow reconfiguring of the shorting bars. The shorting bars are then reconfigured and reattached to the generator by the fasteners. Additionally, the electrical input and output leads of the generator must also be removed and reattached onto the proper terminals formed by the new configuration of shorting bars. This is a rather time consuming, complicated process. Moreover, one has to be very careful to make sure that the generator leads are properly connected to the shorting bars.

The present invention solves many of the problems associated with existing apparatus and methods for changing the electrical output of a generator.

SUMMARY OF THE INVENTION

The present invention relates to a generator output reconnection switch which allows the electrical output of the generator to be changed without having to remove and reattach generator leads.

One embodiment of the present invention relates to a generator including a permanent board assembly mounted on the generator. This board assembly is intended to stay on the generator during use. Generator input and output leads are electrically connected to electrically conductive bus bars disposed on the board assembly. The bus bars connected to the input leads are not electrically connected to the bus bars connected to the output leads. An interchangeable board assembly is provided which includes electrically conductive bus bars disposed thereon. The interchangeable board assembly is mountable on the permanent board assembly such that the bus bars of the interchangeable board assembly electrically connect predetermined ones of the bus bars of the permanent board assembly. Accordingly, a completed electrical bus or path is created between predetermined ones of the input and output leads of the generator such that the electrical output of the generator can be changed. Since the input and output leads are attached to the permanent board assembly it is not necessary to remove and reattach leads when changing the electrical output of the generator.

In one embodiment, turnbuckles are used to remove and attach the interchangeable board to the permanent board thereby allowing for quick interchange of boards.

In another embodiment, the bus bars on at least one of the boards assemblies are electrically connected to spring biased electrical contacts. When the board assemblies are attached to one another, the electrical contacts are compressed so as to insure good electrical contact at all of the electrical contacts where electrical connection is to occur.

In yet another embodiment, the board assemblies include cooperating alignment means which insure that the boards are properly orientated relative to one another when attaching the interchangeable board assembly to the permanent board assembly.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings wherein like reference numerals and letters generally indicate corresponding parts throughout the different figures:

FIG. 1 is an end elevational view, with portions shown in section, of an embodiment of a generator reconnection switch in accordance with the principles of the present invention being shown mounted on a generator, a top portion of the generator being shown in phantom line;

FIG. 2 is a sectional view of a bottom permanent board assembly of the switch shown in FIG. 1;

FIG. 2A is a sectional view of an embodiment of a spring loaded electrical contact;

FIG. 3A is a top plan view of the permanent board assembly shown in FIG. 2;

FIG. 3B is a side elevational view of the board assembly shown in FIG. 3A;

FIGS. 10A-C are planar, side, and end views of an embodiment of a bracket assembly for attaching the permanent board assembly to the generator housing;

FIG. 12 is a functional block diagram of an embodiment of a voltage regulator circuit utilized in the present invention.

DETAILED DESCRIPTION OF A PREFERRED EMBODIMENT OF THE INVENTION

Figure 4A:
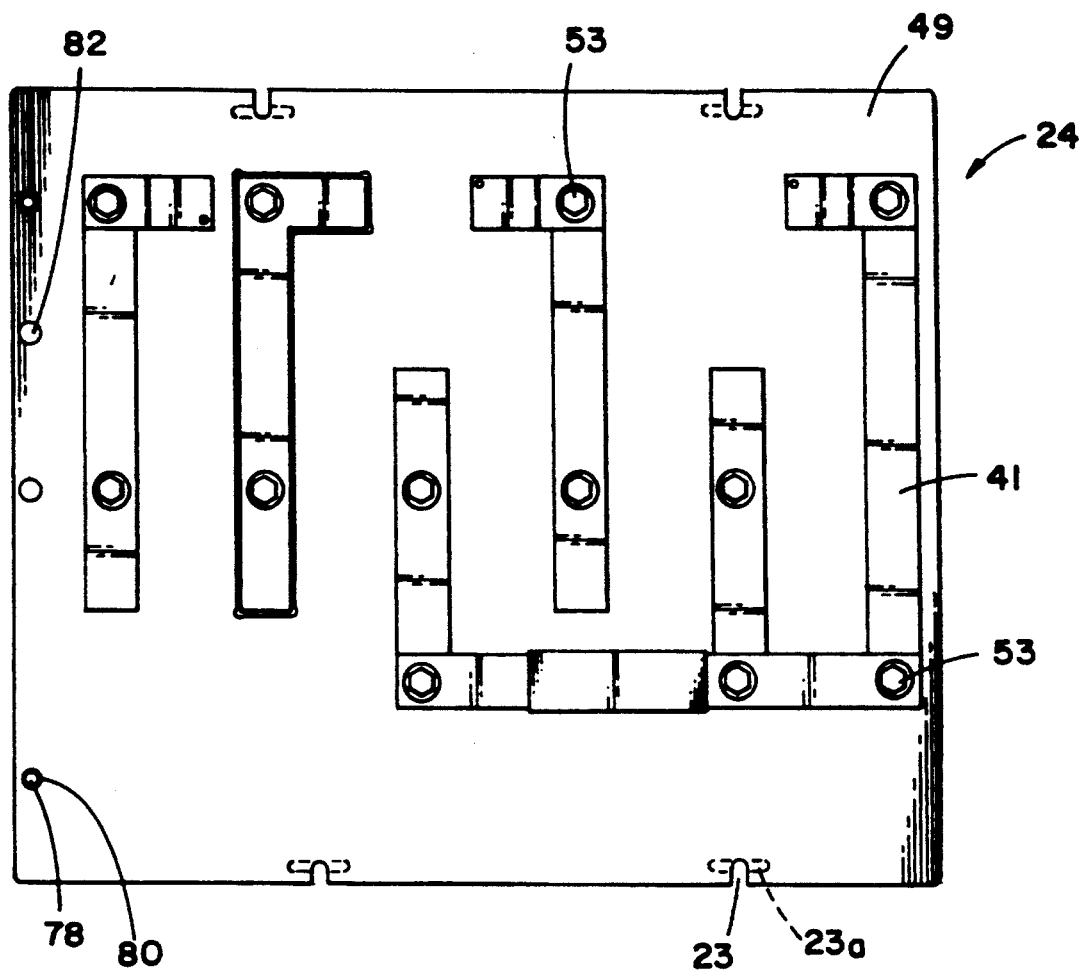
FIG. 4A is a bottom plan view of an embodiment of an interchangeable board assembly which when attached to the board assembly shown in FIG. 3A provides 120/208 volt output from the generator corresponding to a parallel wye configuration.
Figure 4B:
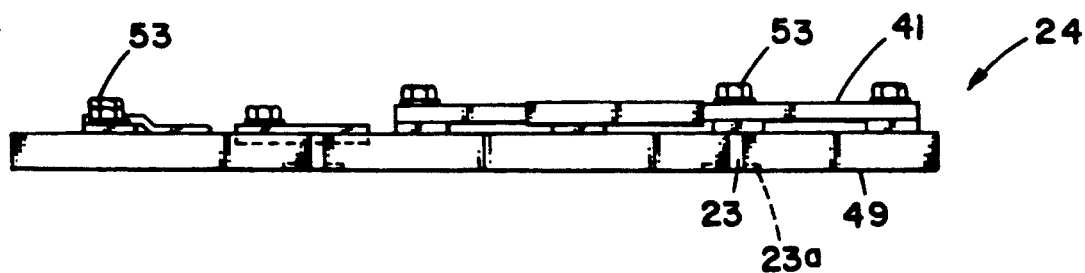
FIG. 4B is a side elevational view of the board assembly shown in FIG. 4A.
Figure 4C:
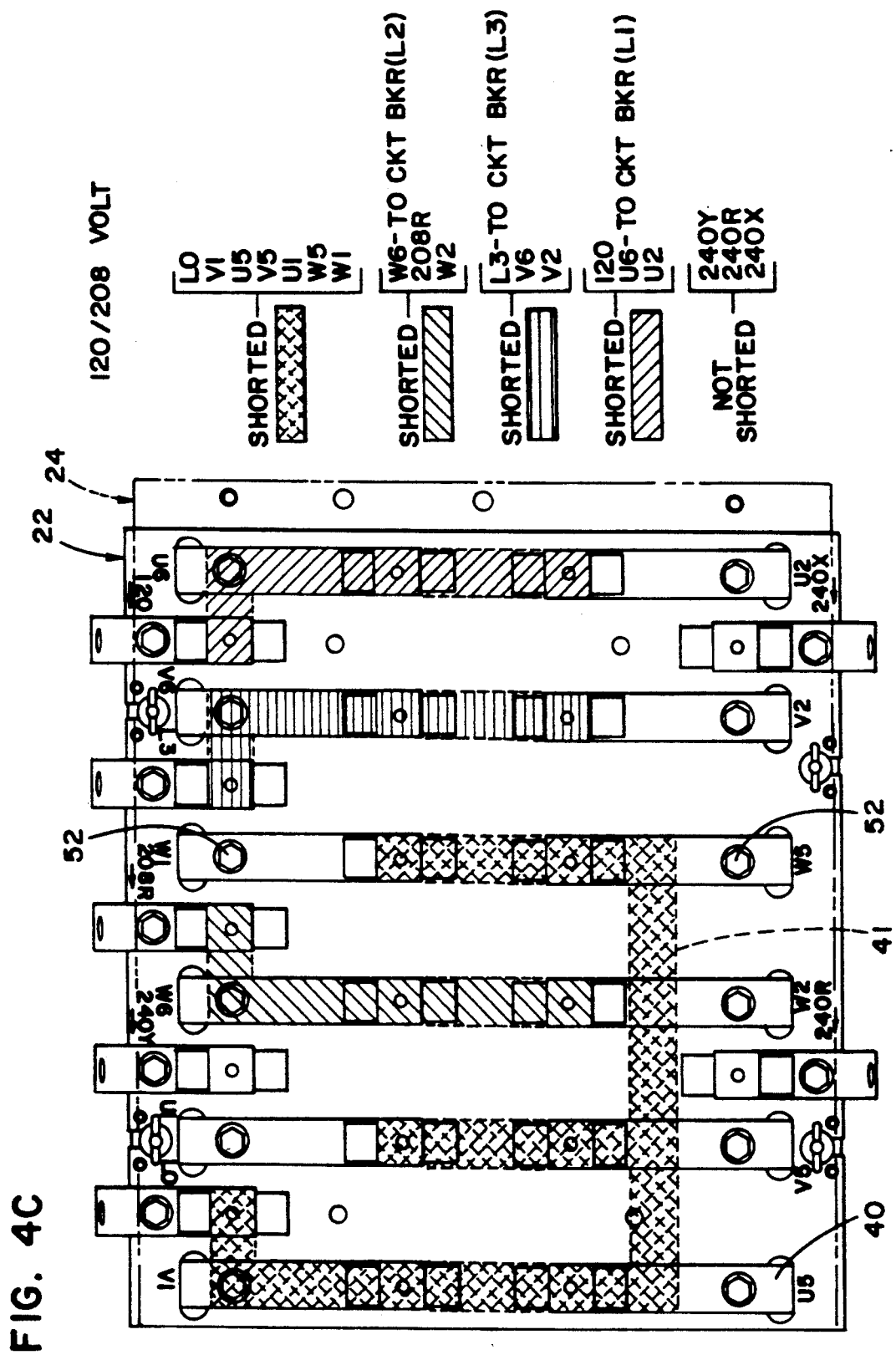
FIG. 4C illustrates the electrical bus connection pattern created between the board assembly of FIG. 4A and the permanent board assembly shown in FIG. 3A.

A preferred embodiment of a switch in accordance with the principles of the present invention will now be described. This detailed embodiment description is provided to facilitate an understanding of the invention and is not intended to limit the invention to the details and features comprising the preferred embodiment.

Referring now to the Figures, there is shown in FIG. 1 a reconnection switch in accordance with the principles of the present invention, the switch being generally referred to by the reference numeral 20. The switch 20 includes a first permanent board assembly 22 permanently mounted onto a generator housing, a portion of which is shown in phantom line and referred to by the reference number 21. The switch 20 further includes a second interchangeable board assembly 24 which is interchangeably attachable to the permanent board assembly 22. In the preferred embodiment shown, four turnbuckles 26 are used to attach the permanent and interchangeable board assemblies 22, 24.

As shown in FIG. 1, the permanent board assembly 22 is suitably mounted to the top of the generator housing 21 by a suitable bracket assembly 30. Input and output electrical leads 39 are electrically connected to bus bars 40 on the board assembly 22. As shown in FIG. 1, terminals 44 are used to attach ends of the leads 39 to the bus bars 40. The electrically conducting copper bus bars 40, suitably mounted on a top surface of the board assembly 22, electrically interconnect the leads 39 to spring loaded electrical contacts 50 on the board assembly 22. The interchangeable board assemblies 24, in turn, have electrically conducting copper bus bars 41 suitably mounted on a bottom surface thereof for electrically connecting selected ones of the electrical contacts 50 in a predetermined configuration so as to provide a desired generator output. When switching from one generator output configuration to another it is not necessary to remove and reattach the leads on the permanent board assembly 22. The interchangeable board assemblies 24 need only be interchanged with one another to change the generator electrical output. The electrical generator engine is shut down during this process.

Figure 7A:
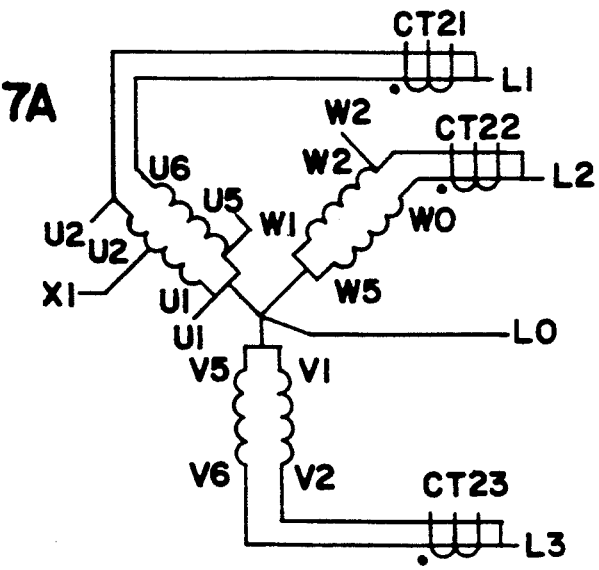
FIGS. 7A–C are diagrams of three embodiments of generator wiring connections: namely a parallel wye configuration, a series wye configuration, and a zig zag configuration.
Figure 7B:
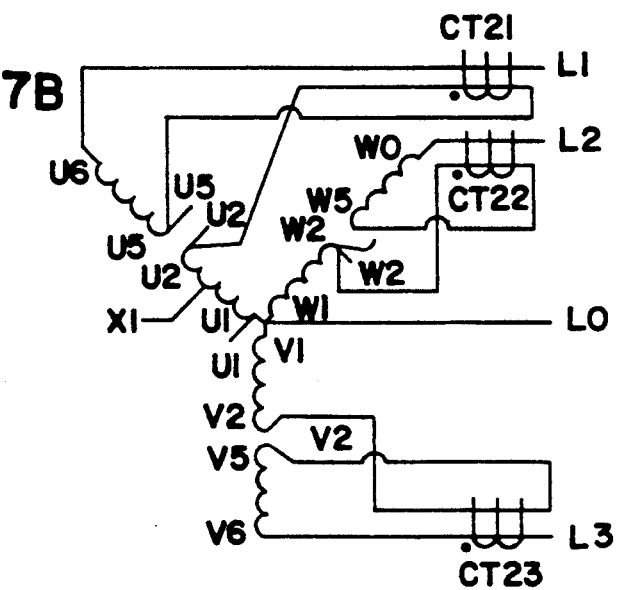
Figure 7C:
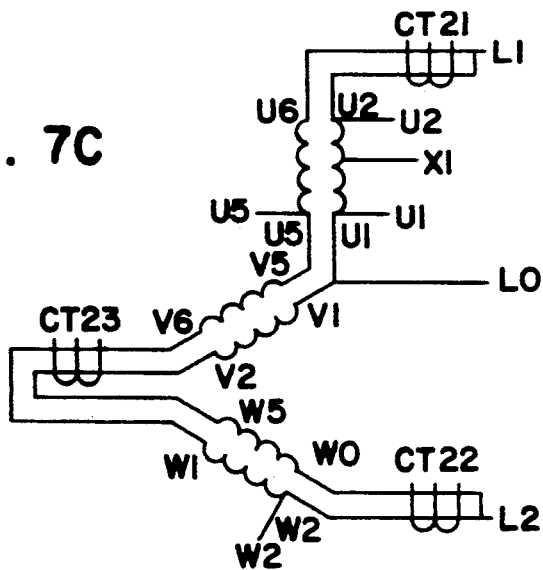

Referring now to FIGS. 1 through 3A, B, the bus bars 40 on the permanent board assembly 22 are each labeled to illustrate their interconnection to the various input, output and control electrical leads 39. The electrical leads 39 include twelve generator coil leads (the generator's electrical coils or windings are shown in FIGS. 7A-C with the generator leads from the windings being correspondingly marked) and the following:

Three main power output leads (L1, L2, L3) which run to a main breaker. L1 and L2 are connected to the same bus bar 40 as are generator leads U6 & W6, respectively. L3 is connected to a separate bus bar, because in one output configuration (single phase, 120/240 volt zig zag) it is not used. These leads provide power to output posts 42 (shown in FIG. 8) of a load terminal block 98 (shown in FIG. 11) which is made from an insulating material such as NEMA grade glass matted polyester.

A neutral lead L0 which runs to the load terminal block 98 of the generator to ground the generator.

Figure 8:
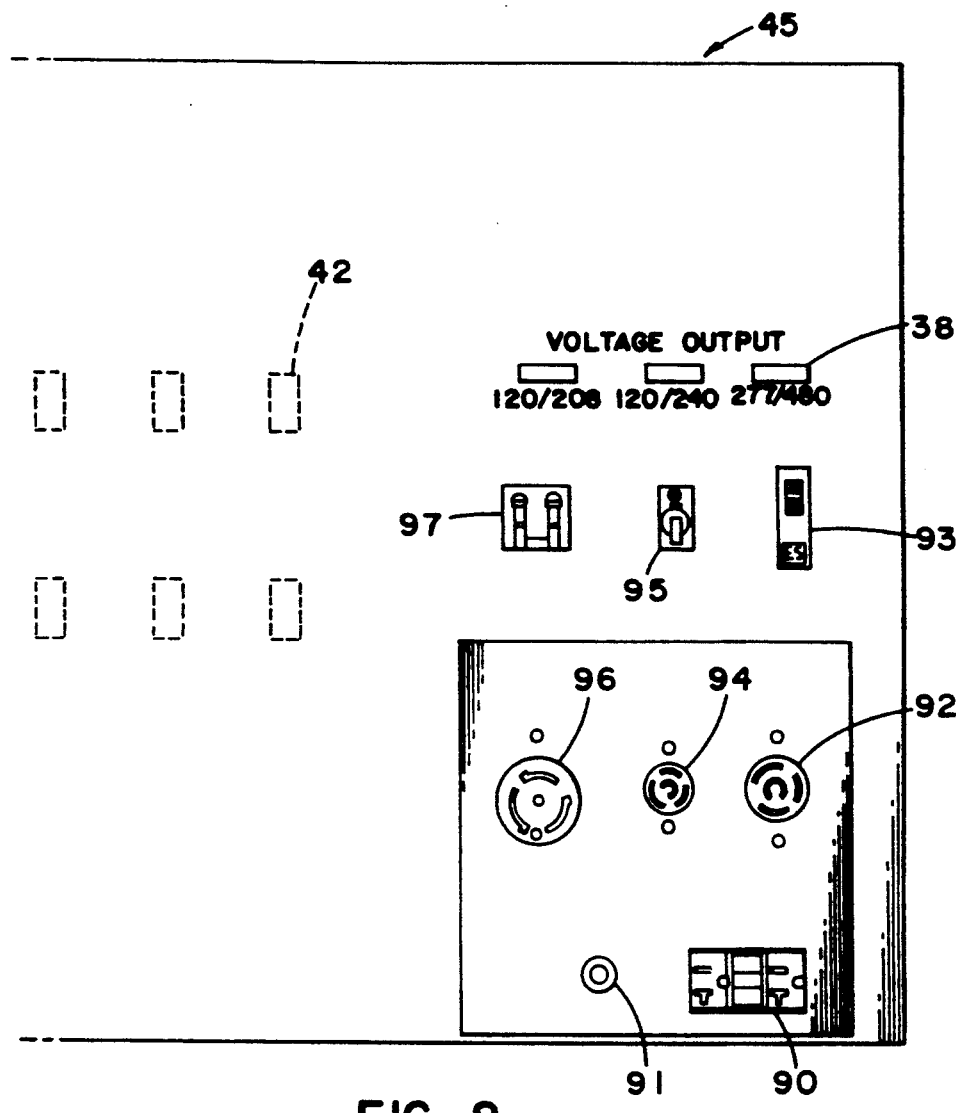
FIG. 8 is a diagrammatic view of an embodiment of a generator control panel in accordance with the principles of the invention.

One lead (labeled 120) which provides power to 120 volt receptacles at a generator control panel 45 (an embodiment of which is shown in FIG. 8).

Two leads (labeled 240X and 240Y) which provide power to 240 volt receptacles at the control panel 45.

Two voltage reference leads (240R and 208R) which provide input signal to a multiple tap reference transformer 100 (shown in FIG. 12).

It will be appreciated that varying generator connections might be utilized and still be in keeping with the principles of the invention.

As noted above, certain ones of the leads 39 are suitably electrically connected to output posts 42 and conventional generator electrical receptacles at the control panel 45. Illustrated in FIG. 8 is an embodiment of the control panel 45 illustrating such posts 42 and receptacles. A user can electrically plug in to the receptacles an electrical device which is to be powered by the generator. The electrical posts 42 allow electrical systems to be hard wired to the generator by the operator. This might be accomplished by the use of threaded terminals suitably received in threaded apertures in the posts 42. The control panel 45 of the preferred embodiment is provided with four receptacles: 1) A 20 amp/120 volt ground fault receptacle 90 protected by a twenty (20) amp breaker 91. 2) A 20 amp/120 volt twistlock receptacle 92 protected by a twenty (20) amp ground fault breaker 93. 3) A 30 amp/240 volt receptacle 94 protected by a thirty (30) amp breaker 95. 4) A 50 amp/240 volt receptacle 96 protected by a fifty (50) amp breaker 97. Shown in FIGS. 4A, C through 6A, C are three interchangeable board assemblies 24 each having copper bus bars 41 mounted thereon in a different electrical bus configuration on a bottom surface thereof. When a bottom surface of one of the interchangeable board assemblies is mounted onto a top surface of the permanent board assembly 22 an electrical circuit is completed between the input and the output leads of the generator which are attached to the permanent board assembly 22. By interchanging the three different board assemblies 24, it is possible to change the electrical output characteristics of the generator 21.

In the preferred embodiment the bus bars 40, 41 on the board assemblies 22, 24 are 3/16" by 1" bus bars. Larger or smaller bus bars might be utilized depending on the electrical characteristics of the generator system. Mounting assemblies 52, 53, respectively, are used to suitably mount the bus bars 40, 41 onto the surface of the board assemblies 22, 24. The bus bars 40, 41 are mounted on support board members 48, 49, respectively, made of an insulating material such as NEMA grade glass matted polyester. With support board 48 having a fiber paper layer 43. Some of the bus bars 40, 41 might be wrapped with an insulator 46 or be thicker than others because of the electrical load carried thereon, and the possibility of shorting between bars.

Figure 9:
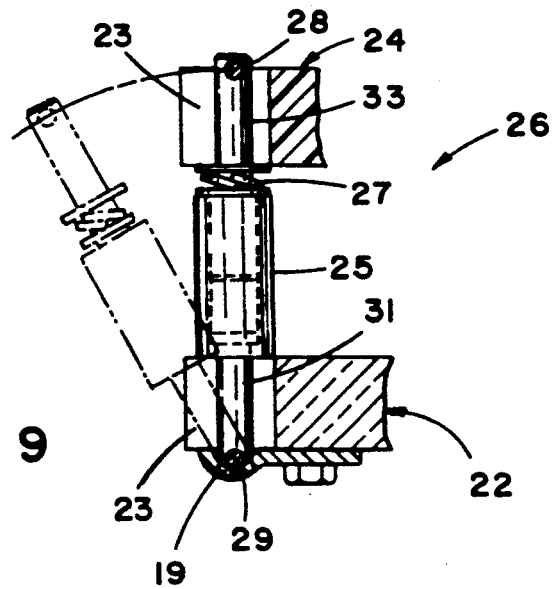
FIG. 9 is an elevational view of an embodiment of a turnbuckle for fastening the board assemblies together in accordance with the principles of the present invention.

Illustrated in FIG. 9 is an embodiment of a turnbuckle which might be used in the present invention. The turnbuckles 26 are used to interchange the board assemblies 24 by simply turning a hexagonal mid-section 25 of the turnbuckles 26 so as to loosen the turnbuckles and then pivoting the turnbuckles 26 out of the way when interchanging board assemblies 24. The turnbuckles 26 are then pivoted back into place and the hexagonal mid-section 25 of the turnbuckles 26 is turned to apply an appropriate force holding the board assemblies 22, 24 together. The mid-section 25 in the embodiment shown is rotatably attached at both ends to elongated upright cylindrical body portions 31 and 33. Portion 31 is held in place with a shoulder while position 33 is threaded. By turning the mid-section 25 the overall length of the turnbuckle 26 can be increased or decreased. In some embodiments the mid-section 25 might be operated by use of a tool such as a wrench and in others the mid-section might be configured so as to enable hand tightening of the turnbuckles. In the preferred embodiment a lock washer 27 is used to indicate when the turnbuckles 26 are properly tightened by simply observing when the lock washer 27 is flattened out. The turnbuckles 26 include a transverse rod 29 attached to the end of the turnbuckle 26 and pivotally supported in a bracket 19 on a bottom surface of the permanent board assembly 22 for limited pivotal movement. The turnbuckles 26 include a retention member 28 which extends parallel to a top surface of the interchangeable board assemblies 24 when in place. The board assemblies 22, 24 include a slot 23 for receipt of the turnbuckles 26. The board assembly 24 has a recess 23a in a top surface thereof for receiving the retention member 28.

As shown in FIGS. 2 and 3A, B, the spring loaded electrical contacts 50 are spring biased away from the board 22. The contacts 50 include a braided copper strap 54, retained by copper retainers 55, providing an electrical connection between the bus bars 40 and bus bars 41 on the interchangeable board 24 when the interchangeable board is mounted to the permanent board 22. A member 56, having a head portion 56a and a stem portion 56b, is mounted through threaded nut 58 onto the bus bars 40 such that the member 56 is capable of reciprocal movement, away and toward the board assembly 22. The contacts 50 include a threaded housing 59 slidably receiving the stem portion 56b. The housing 59 is attached to the bus bar 40 by nut 58. As a part of the terminals 50, there is a coiled spring 60 concentrically disposed about the stem portion 56b for biasing the contacts 50 upward. In the preferred embodiment shown, the housing 59 and suitable shoulder portion 62 receive the ends of the coiled spring 60 which is electrically insulated with phenolic washer 57. A retention member 56c is present on the stem portion 56b in the preferred embodiment for limiting the amount the member 56 can be biased upward. In the embodiment shown this is accomplished by the retention member 56c engaging the hex head 61 of the housing 59 so as to prevent continued vertical movement of the member 56. A pin 51 prevents the spring loaded contacts 50 from rotating about member 56 relative to the bus bars 40.

As can be seen in FIGS. 3A, B, the bus bars 40 are arranged on the board assembly 22 so as to form a plurality of the electrical contacts 50 in a pre-determined configuration. The interchangeable board assembly 24, when mounted on the permanent board assembly 22, engages selected ones of these electrical contacts 50, in a predetermined manner so as to provide a complete electrical bus between selected ones of the inlet and outlet leads 39 in a manner which provides the requisite electrical output from the generator.

Referring to FIGS. 4A, B through 6A, B, there are shown three different interchangeable board assemblies 24. These assemblies will now be discussed in more detail.

FIGS. 4A, B show an embodiment of an interchangeable board which connects the leads 39 so as to provide three phase 120/208 volt (line to neutral voltage/line to line voltage) parallel wye output. Power is provided to 120 volt receptacles at the control panel 48. A reference signal is provided to a 208 volt tap of the multiple tap reference transformer.

Figure 5A:
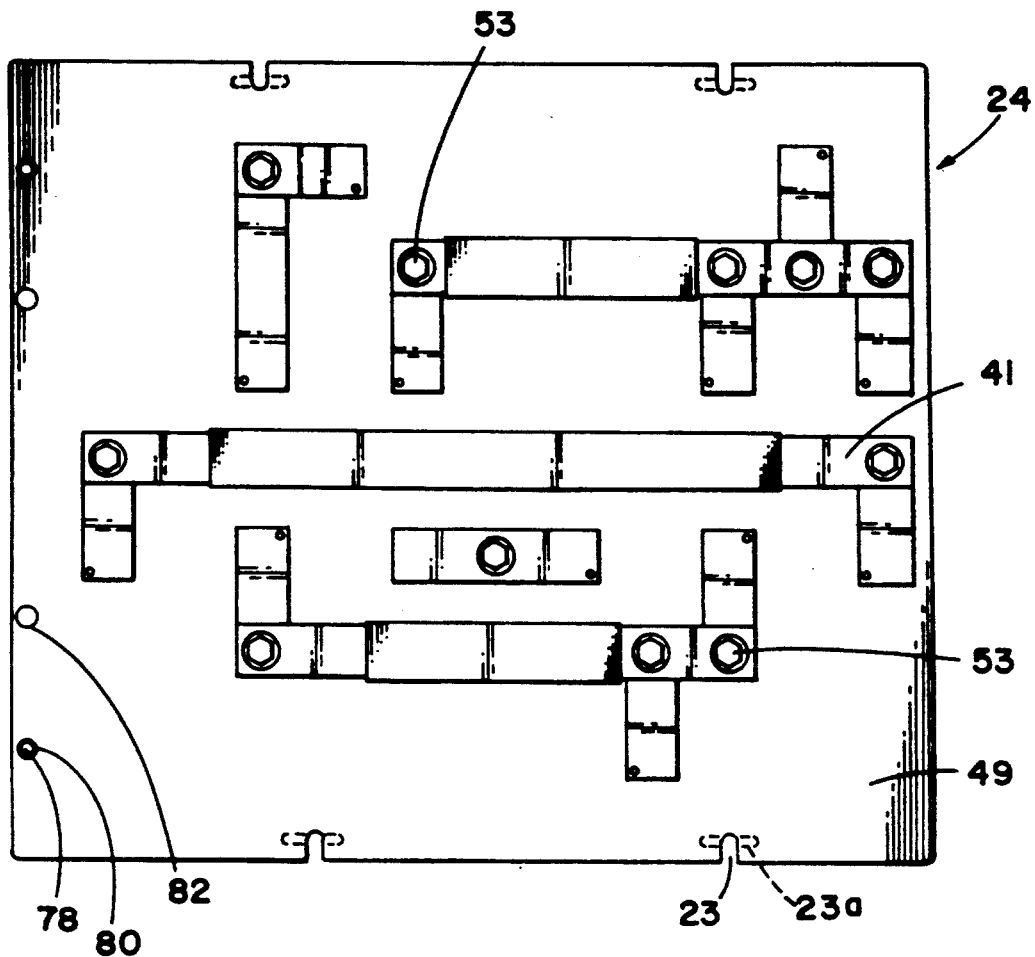
FIG. 5A is a bottom plan view of an embodiment of an interchangeable board assembly which when attached to the board assembly shown in FIG. 3A provides 277/480 volt output from the generator corresponding to a series wye configuration.
Figure 5B:
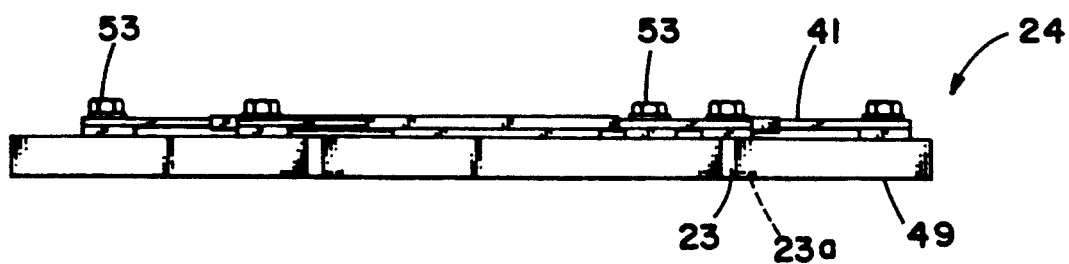
FIG. 5B is a side elevational view of the board assembly shown in FIG. 5A.
Figure 5C:
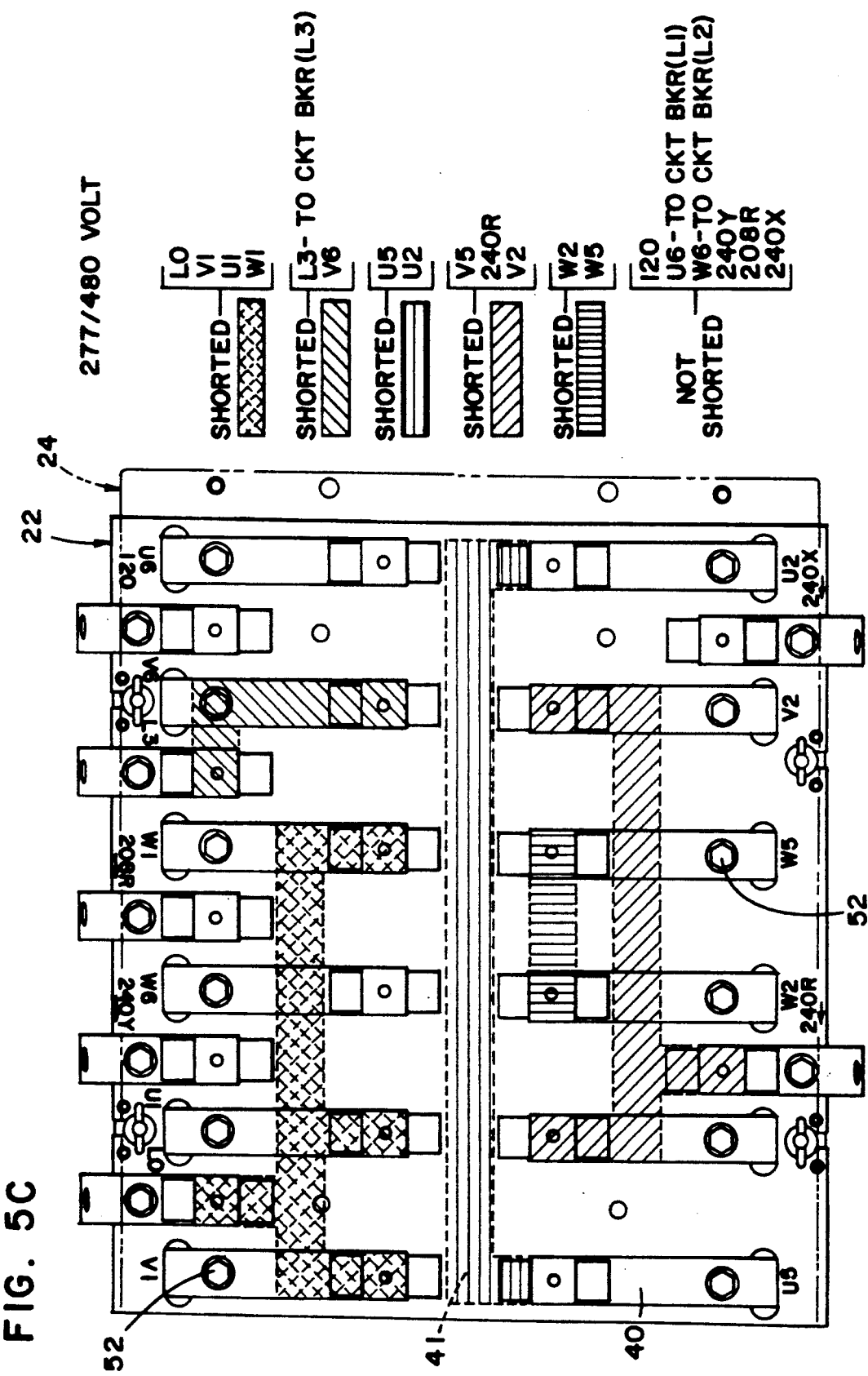
FIG. 5C illustrates the electrical bus connection pattern created between the board assembly of FIG. 5A and the permanent board assembly shown in FIG. 3A.

FIGS. 5A, B show an embodiment of an interchangeable board which connects the leads 39 so as to provide three phase 277/480 volt parallel wye output. All receptacles are unpowered and a reference signal is provided to a 240 volt tap of the multiple tap reference transformer.

Figure 6A:
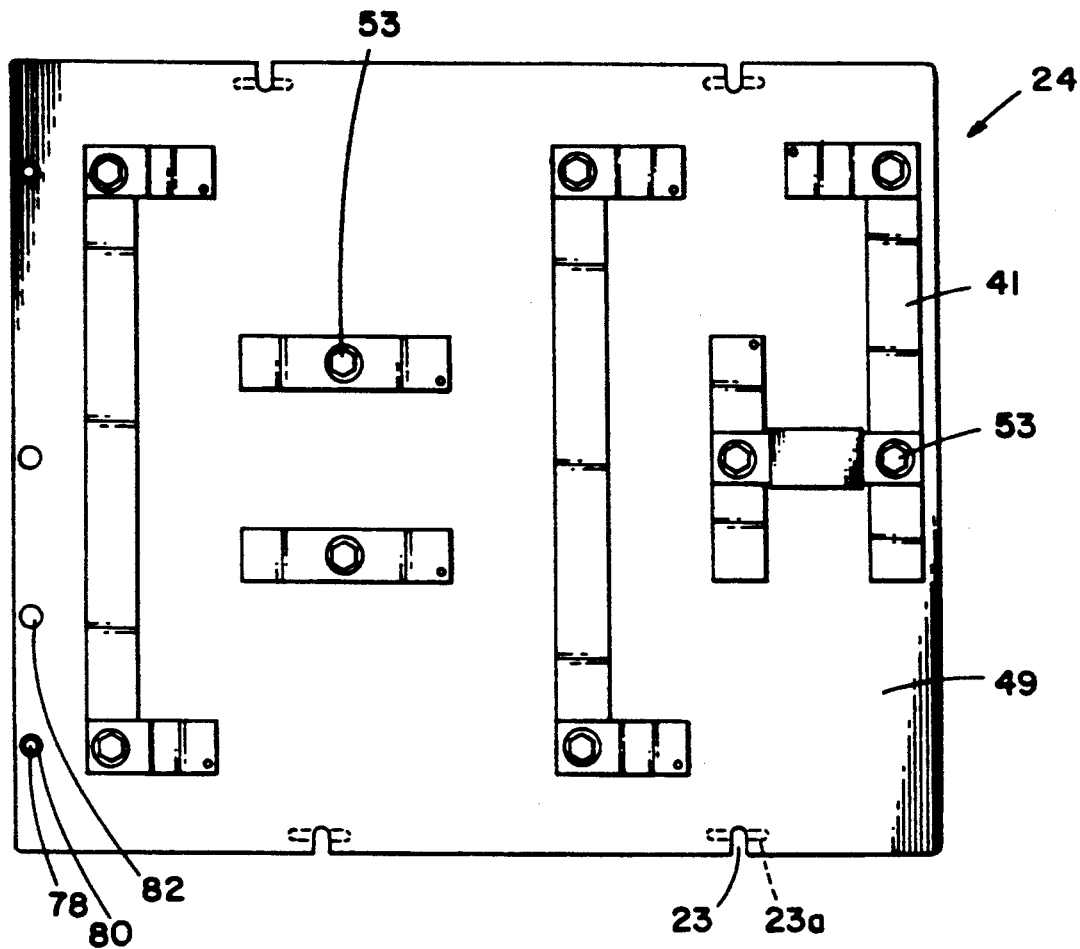
FIG. 6A is a bottom plan view of an embodiment of an interchangeable board assembly which when attached to the board assembly shown in FIG. 3A provides 120/240 volt output from the generator corresponding to a zigzag configuration.
Figure 6B:
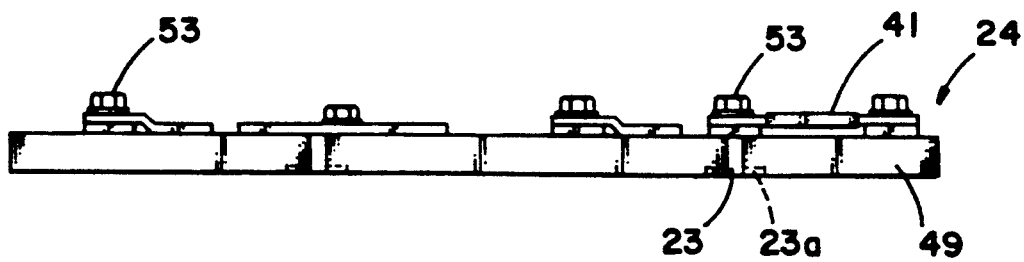
FIG. 6B is a side elevational view of the board assembly shown in FIG. 6A.
Figure 6C:
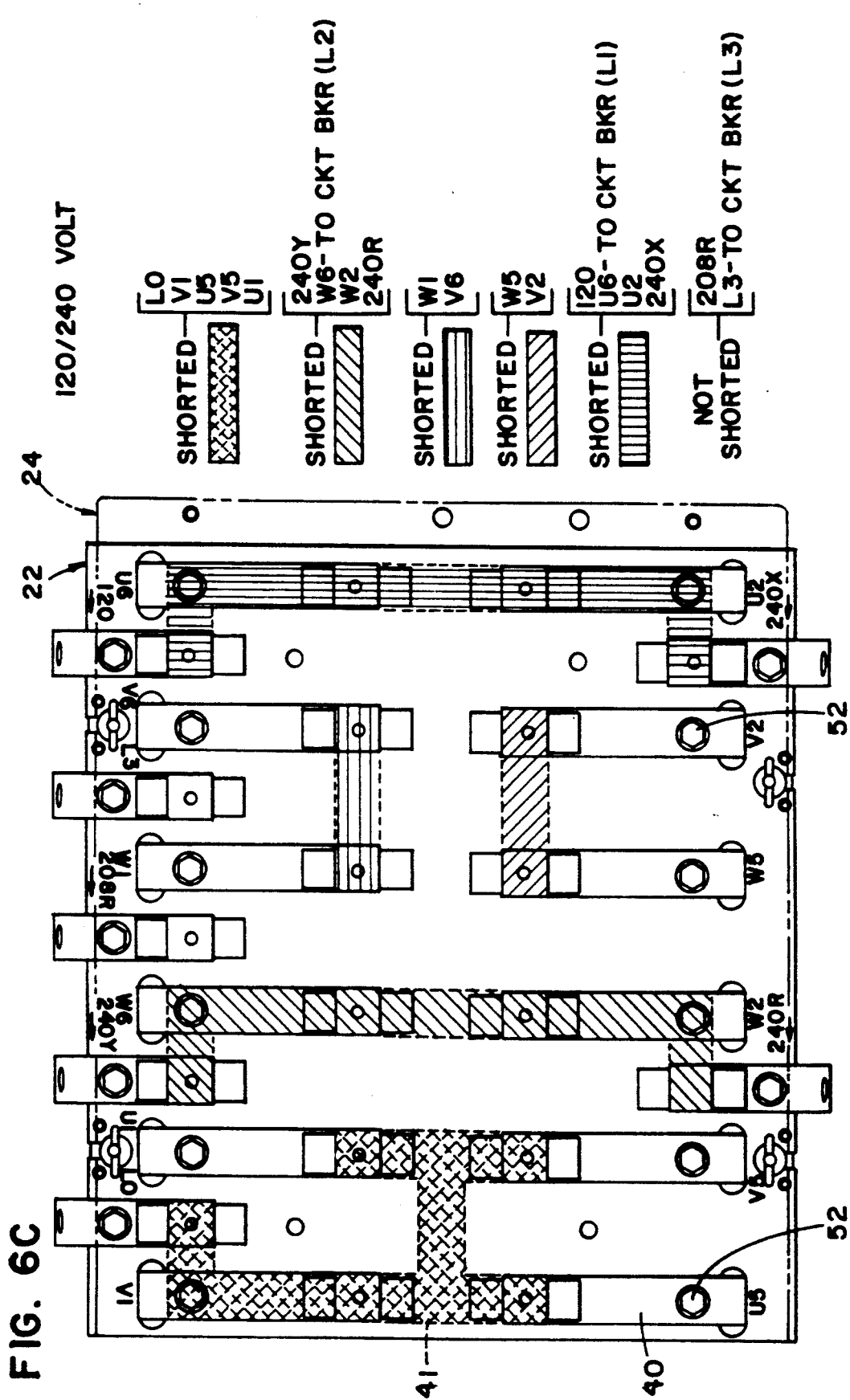
FIG. 6C illustrates the electrical bus connection pattern created between the board assembly of FIG. 6A and the permanent board shown in FIG. 3A.

FIGS. 6A, B show an embodiment of an interchangeable board 24 which connects the leads 39 so as to provide single phase 120/240 volt zig zag output. Power is provided to all receptacles at the control panel 45. A reference signal is provided to the 240 volt tap of the multiple tap reference transformer.

FIGS. 4C through 6C illustrate the specific interconnection provided by the boards 22, 24. The connection patterns created by the interchangeable board assemblies 24 on the permanent board assembly 22 are differentially shaded to show the interconnection patterns overlaid on the permanent board assembly 22. It will be appreciated that other board configurations might be provided depending on the electrical output capabilities of the generator and the need for those output capabilities.

An embodiment of the bracket assembly 30 is illustrated in FIG. 10. The bracket assembly 30 shown includes a first generator bracket 70 fixedly attached to the generator housing. A second permanent board assembly support bracket 72 is attached to the generator bracket at one end and includes apertures 74 to enable attachment to the generator housing at the other end. In the preferred embodiment, the board assembly support bracket 72 includes four vertically extending posts 76 disposed on a major surface thereof. The posts 76 are received in apertures 77 defined in the permanent board assembly 22 to insure that the permanent board assembly 22 is properly mounted on the support bracket 72. In addition, there are two vertically extending alignment posts 78 disposed along one end of the support bracket which are received in two apertures 80 defined in the interchangeable board assemblies 24. The posts 78 and apertures 80 cooperate to insure that the interchangeable board assembly 24 is properly oriented with respect to the permanent board assembly 22. The aligning mechanism of the support bracket 72 thus insures that the board assemblies 22, 24 are properly orientated both with respect to the generator and with respect to each other.

Three sets of electrical wires 32 controlling three different voltage indicator lights 38 on the control panel 45 of the generator are supported by the bracket assembly 30 and are electrically attached to terminals 34 mounted on the bracket 72. The terminals 34 have elongated push button contact switches 36 extending above the bracket 72. The indicator lights 38 indicate to the user which one of the three electrical configurations: 120/208 volts; 277/480 volts; and 120/240 volts, the generator is currently connected in. Each of the interchangeable boards 24 has two apertures 82 aligned with two of the pushbutton contact switches 36, such that when one of the interchangeable boards is attached to the permanent board 22, one of the contact switches is depressed and the appropriate indicator light 38 is illuminated at the control panel 45 to indicate the current configuration of the generator.

Figure 11:
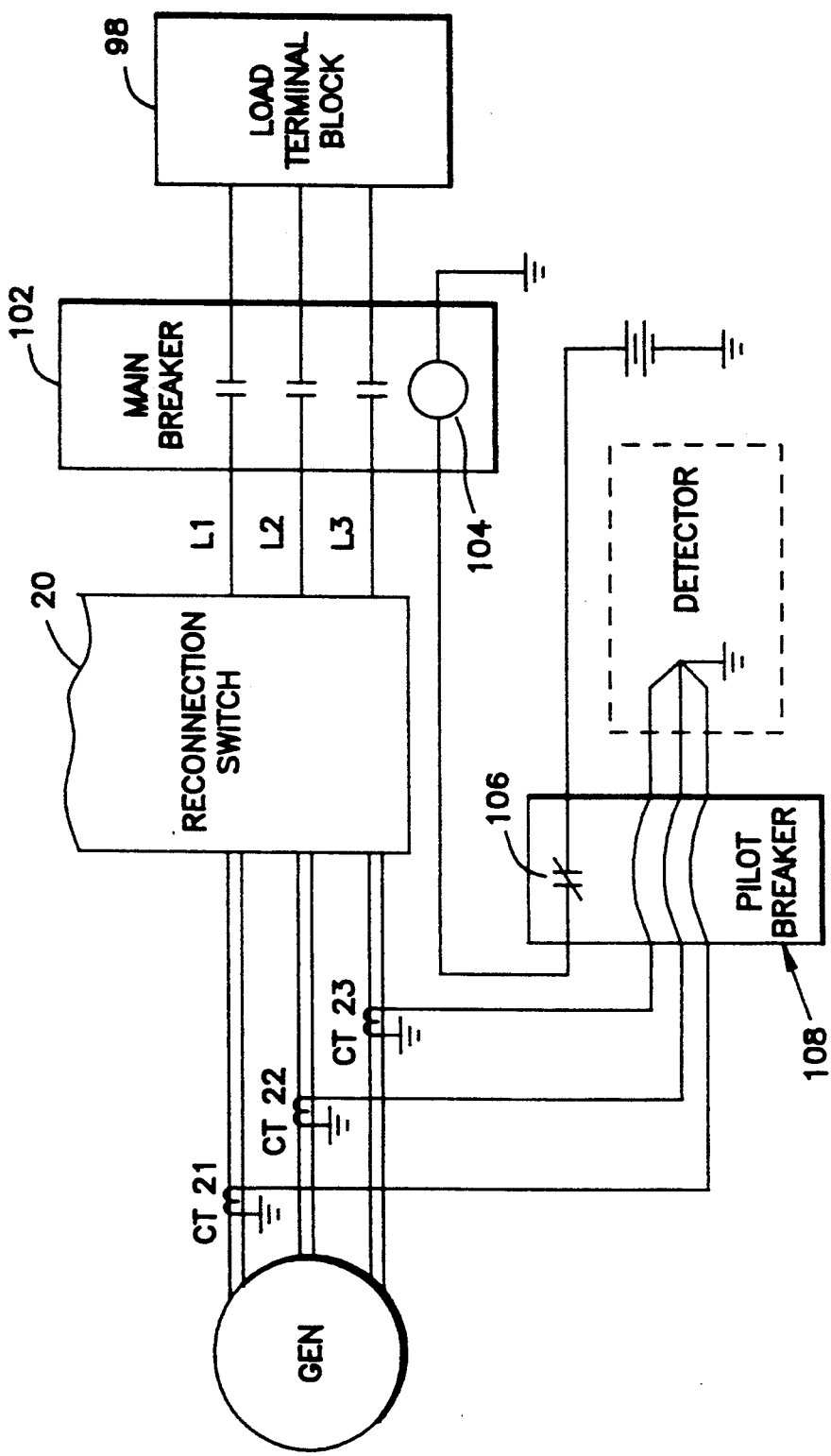
FIG. 11 is a functional block diagram of an embodiment of an overcurrent protection circuit utilized in the present invention.

In the preferred embodiment, a main circuit breaker 102, as shown in FIG. 11, is equipped with a shunt trip coil 104. The coil is energized through an auxiliary switch 106 of a pilot breaker 108, which senses load current through current transformers. Although output current will differ by a factor of two depending on how the generator coils are connected (series or parallel), the current in the individual coils will be roughly the same at rated load in any configuration. Current transformers CT21, CT22, CT23 will sense current in the coils and will send a proportional current signal to the pilot breaker 108. When the signal exceeds the pilot breaker's trip point, the auxiliary switch 106 will close which will energize the shunt trip coil 104 of the main breaker 102, causing the main breaker contacts to open.

In the preferred embodiment the multiple tap reference transformer 100, shown in FIG. 12, is used. A reference signal is supplied from the switch 20 to a tap on the primary winding of the transformer 100. A secondary winding of the multiple tap transformer is connected to a sensing input of the voltage regulator 110. By adjusting the voltage regulator's input to an excitation coil 112 of the generator, the same regulator circuit can maintain voltage at different levels as is required by the different configurations of the generator.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

What is claimed is:

1. An apparatus comprising:
   (a) an electrical generator having a plurality of armature coils;
   (b) a first board mounted on the generator and including a plurality of electrically conducting buses, to which input and output leads are attachable proximated one end, and having an electrical contact proximate another end, selected ones of the leads are also attached to selected ones of the field coils; and
   (c) a second board being interchangeably attachable to the first board, including a plurality of electrically conducting buses, wherein the buses are configured and arranged to selectively electrically connect selective ones of the contacts on the first board, thereby electrically connecting selected ones of the input leads to selected ones of the output leads to provide predetermined generator electric output, when the second board is not in place the connections are not made.

2. An apparatus in accordance with claim 1, wherein turnbuckles are used to attach the second board to the first board.

3. An apparatus in accordance with claim 1, wherein the electrical contacts on said first board are spring loaded for biasing the contacts towards said second board.

4. An apparatus in accordance with claim 1 comprising alignment means for aligning the second board with respect to the first board such that the buses on the second board will contact the appropriate electrical contacts on the first board to properly control the output of the generator.

5. An apparatus in accordance with claim 4, wherein said alignment means are a plurality of alignment posts receivable in a plurality of apertures, the plurality of apertures and posts are arranged such that when the apertures receive the posts the first and second boards are in proper alignment.

6. An apparatus in accordance with claim 1 comprising a plurality of generator electrical output indicator lights indicating the output of the generator, wherein one of the generator electrical output indicator lights is illuminated when the second board is attached to the first board, indicating the electrical output of the generator.

7. An apparatus in accordance with claim 1, wherein the electrical buses are electrically conducting bus bars disposed on a surface of both the first and second boards.

8. An apparatus is accordance with claim 1, wherein several of the output leads are connected to a main circuit breaker which is controlled by a pilot breaker.

9. An electrical switch comprising:
   (a) a first board including a plurality of electrically conducting buses, wherein disposed proximate one end of each bus is a terminal to which a plurality of input and output leads are attachable and disposed proximate another end of each bus is an electrical contact;
   (b) a second board being interchangeably attachable to the first board, including a plurality of electrical buses, wherein the buses are configured and arranged to selectively electrically connect selected ones of the contacts on the first board, thereby electrically connecting selected ones of the input leads to selected ones of the output leads to provide a predetermined arrangement of electrical connections, the contacts being spring loaded for biasing the contacts towards the second board; and
   (c) a means for fastening the first board to the second board.

10. An apparatus in accordance with claim 9, wherein the means for attaching the first board to the second board includes turnbuckles.

11. An apparatus in accordance with claim 9, comprising alignment means for aligning the second board relative to the first board such that buses on the second board will contact the appropriate electrical contacts on the first board.

12. An apparatus in accordance with claim 11, wherein said alignment means are a plurality of alignment posts receivable in a plurality of apertures, the plurality of apertures and posts arranged such that when the apertures receive the posts the first and second boards are in proper alignment.

13. An apparatus in accordance with claim 9 comprising a plurality of indicator lights indicating which of the interchangeable second boards is attached.

14. An apparatus in accordance with claim 9, wherein the electrical buses are electrically conducted bus bars disposed on a surface of both first and second boards.

* * * * *